United States Patent
Lin et al.

(10) Patent No.: US 8,040,823 B2
(45) Date of Patent: Oct. 18, 2011

(54) METHOD AND SYSTEM FOR NETWORK DATA TRANSMITTING

(75) Inventors: Tzu-Ming Lin, Hsinchu (TW); Yuan-Ying Hsu, Taipei (TW); Jen-Shun Yang, Hsinchu (TW); Jui-Tang Wang, Hsinchu (TW)

(73) Assignees: Industrial Technology Research Institute, Hsinchu (TW); Telcordia Applied Research Center Taiwan Company, Taipei (TW)

( * ) Notice: Subject to any disclaimer, the term of this patent is extended or adjusted under 35 U.S.C. 154(b) by 336 days.

(21) Appl. No.: 11/955,582

(22) Filed: Dec. 13, 2007

(65) Prior Publication Data

US 2009/0028069 A1    Jan. 29, 2009

Related U.S. Application Data

(60) Provisional application No. 60/901,673, filed on Feb. 16, 2007, provisional application No. 60/879,047, filed on Jan. 8, 2007.

(51) Int. Cl.
    *H04L 12/28* (2006.01)

(52) U.S. Cl. ........ 370/256; 370/254; 370/338; 370/400; 709/227; 709/238

(58) Field of Classification Search .......... 370/238, 370/252, 254, 338, 400; 709/223, 227, 238; 707/102
    See application file for complete search history.

(56) References Cited

U.S. PATENT DOCUMENTS

| | | | |
|---|---|---|---|
| 5,974,236 A * | 10/1999 | Sherman ............... | 709/221 |
| 6,188,675 B1 * | 2/2001 | Casper et al. ............ | 370/254 |
| 6,192,051 B1 | 2/2001 | Lipman et al. | |
| 6,618,755 B1 | 9/2003 | Bonn | |
| 6,870,818 B1 * | 3/2005 | Burdin et al. ............ | 370/257 |
| 6,934,252 B2 | 8/2005 | Mehrotra et al. | |
| 7,257,628 B2 * | 8/2007 | Liskov et al. ............ | 709/223 |
| 2003/0074450 A1 * | 4/2003 | Kang ........................ | 709/227 |
| 2006/0029002 A1 * | 2/2006 | Park et al. ................. | 370/254 |
| 2006/0245360 A1 * | 11/2006 | Ensor et al. .............. | 370/238 |
| 2006/0268854 A1 * | 11/2006 | Lee .......................... | 370/389 |
| 2007/0082621 A1 | 4/2007 | Lee et al. | |

OTHER PUBLICATIONS

Elizabeth Royer et al., "A Review of Current Routing Protocols for Ad Hoc Mobile Wireless Networks", IEEE Personal Communications, Apr. 1999, pp. 46-55.

Santosh Abraham et al., "802.11 TGs Simple Efficient Extensible Mesh (SEE-Mesh) Proposal", IEEE 802.11-05/0562r4, Jan. 9, 2006, pp. 1-152.

Yuan-Ying Hsu et al., "Systematic relay station identification allocation and relay path configuration mechanism for IEEE 802.16j (Multi-Hop Relay)", IEEE C802.16j-06/171, Nov. 7, 2006, pp. 0-15.

(Continued)

*Primary Examiner* — Dang Ton
*Assistant Examiner* — Mohamed Kamara
(74) *Attorney, Agent, or Firm* — Finnegan, Henderson, Farabow, Garrett & Dunner, LLP

(57) ABSTRACT

A method and system for network data transmitting in a communication system includes transmitting a data from at least one transmission node to at least one receiving node of a transmission-receiving group among the plurality of communication nodes by utilizing a node ID, the node ID of communication node in the group is being assigned by a N-carry operation of a determined number N.

114 Claims, 14 Drawing Sheets

OTHER PUBLICATIONS

Aik Chindapol et al., "Efficient Systematic CID Allocation and Relay Path Configuration Mechanism for IEEE 802.16j (Multi-hop Relay)", IEEE C80216j-07/048r6, Jan. 8, 2007, pp. 0-10.

Aik Chindapol et al., "Connection Management and Relay Path Configuration", IEEE C80216j-07/241r5, Mar. 15, 2007, pp. 0-26.

Charles Perkins et al., "Highly Dynamic Destination-Sequenced Distance-Vector Routing (DSDV) for Mobile Computer", 1994 ACM 0-89791-682-4/94, Aug. 1994, pp. 234-244.

C. Perkins et al., "Ad hoc On-Demand Distance Vector (AODV) Routing", Network Working Group for Comments:3561, Jul. 2003, pp. 1-33.

* cited by examiner

METHOD AND SYSTEM FOR NETWORK DATA TRANSMITTING

PRIORITY

This application claims the benefit of U.S. Provisional Application No. 60/879,047, filed Jan. 8, 2007, and U.S. Provisional Application No. 60/901,673, filed Feb. 16, 2007, both of which are incorporated by reference herein in their entirety for any purpose.

TECHNICAL FIELD

The present disclosure relates generally to network systems and, more particularly, relates to method and system for network data transmitting.

BACKGROUND

In communication systems a network node (or so called host) can allocate its ID or address statically or dynamically. In a static configuration, users need to acquire an available address in advance and manually configure the address. In contrast, in a flexible multi-hop environment, such as the type described in IEEE 802.16j, it is not reasonable for operators or users to perform manual configuration. Another choice, dynamic configuration, allows a node to configure its ID or acquire an ID from a centralized server dynamically. In a typical dynamic configuration scheme, all node IDs are assigned randomly, and additional routing algorithms or routing tables are required in order for nodes to exchange or maintain additional routing information and to decide routing paths.

FIG. 1 illustrates an exemplary multi-hop relay (MR) network 100. In network 100, a multi-hop relay base station BS (MR-BS) 102 acts as a root node, and relay stations (RSs) and mobile stations (MSs) act as intermediate nodes or leaf nodes. A network setup process assigns each network node an identification (or address) and constructs routing groups between nodes. For example, RS3 104 is assigned an address and is responsible for forwarding packets from MR-BS destined to RS4 106, and RS1 108 will drop the packets it receives from MR-BS that are destined to RS3. Such routing information may be maintained in a routing table of each RS so that when an intermediate node leaves or enters the network, that newest routing information can be updated.

Two examples show utilization of routing tables. U.S. Pat. No. 6,192,051 discloses a multi-level tree data structure in a centralized routing table and in distributed forwarding tables for forwarding network packets. Each level of each structure is associated with a different field of a network address appearing in received packets. U.S. Pat. No. 6,934,252 discloses binary network address lookups using parent node information stored in routing table entries. Variable length prefixes are stored in a network address forwarding table. Each prefix corresponds to an entry in the forwarding table. Each entry in the forwarding table includes path information regarding parent nodes of each entry in the binary tree.

Node identification may be performed without maintaining a routing table. U.S. Pat. No. 6,618,755 discloses a software facility for automatically identifying subnets in a network by a range of addresses within the network represented by nodes in the network. The addresses each include an ordered series of a fixed number of bits.

A prime factorization method to represent nodes of a network and groups between nodes is described in US2006/0198320, as well as in IEEE C802.16j-06/171. In the forwarding process of this method, a receiving node needs to factorize the ID number of the packet received to determine where to forward the packet. Another method is described in IEEE C802.16j-07/048r6, which relates to a contiguous integer block routing method, in which a network node identifies the integer block of a received address to determine where to forward the packet or if it should drop the packet.

SUMMARY OF THE INVENTION

In one exemplary embodiment consistent with the present disclosure is a method for transmitting data in a network. The method comprises forming a logical tree topology by connecting a root node and one or more child nodes among a plurality of nodes in the network; generating a node ID for each of the child nodes by a N-carry operation of a determined number N, and transmitting data by utilizing the generated node ID of the child nodes.

In another exemplary embodiment consistent with the present disclosure is a communication system. The system comprises a plurality of communication nodes interconnected to form a network, and a root node and one or more child nodes are connected among the plurality of communication nodes to form a logical tree topology; each of the child nodes having assigned thereto a node ID generated by a N-carry operation of a determined number N; and wherein data is transmitted by utilizing the assigned node IDs of the child nodes.

Yet in another exemplary embodiment consistent with the present disclosure is a communication node in a transmission-receiving group of a network, the network including a plurality of network nodes and the transmission-receiving group including at least one transmission node and at least one receiving node. The communication node comprising: at least one memory to store data and instructions; and at least one processor configured to access the memory, and when executing the instructions, configured to: transmitting a communication data by utilizing a node ID, the node ID is being assigned by a N-carry operation of a determined number N.

It is to be understood that both the foregoing general description and the following detailed description are exemplary and explanatory only and are not restrictive of the invention, as claimed.

DETAILED DESCRIPTION

In a communication system environment, data could be transmitted among a transmitting-receiving group of plurality of communication nodes through a transmitting-receiving path from a first level transmission node to its first level receiving node or subsequent levels of receiving nodes. As an exemplary example, a logical tree-based topology may be formed a network including a plurality of nodes by designating one of the network nodes as a root node, and one or more other nodes as child nodes among the plurality of nodes of the network. FIG. 2 is a schematic example of a network 200 configured to have such a logical tree-based topology consistent with embodiments of the invention. The tree based topology configured with a maximum number of k child levels. More broadly, the communication system could be any network topology, for example, a tree-based network or a mesh network.

Each of the child nodes in a $k^{th}$ child level of network 200 is assigned an identification $a_k$ for each parent node to identify this child node, where identification $a_k$ could be any number. During an implementation stage, identification $a_k$ could be an integer greater than or equal to 0, and less than or equal to N, N is a determined number. N may be pre-defined to any arbitrary number or to a maximum number of child nodes connected to each of the plurality of nodes of the tree topology. In some implementation, the determined number N could maintain by the system dynamically. Furthermore, identification $a_k$ may be assigned by a random sequence or sequentially. In one example, identification $a_k$ of each child node may be assigned according to a sequence in which it becomes associated with its parent node.

Figure 1:
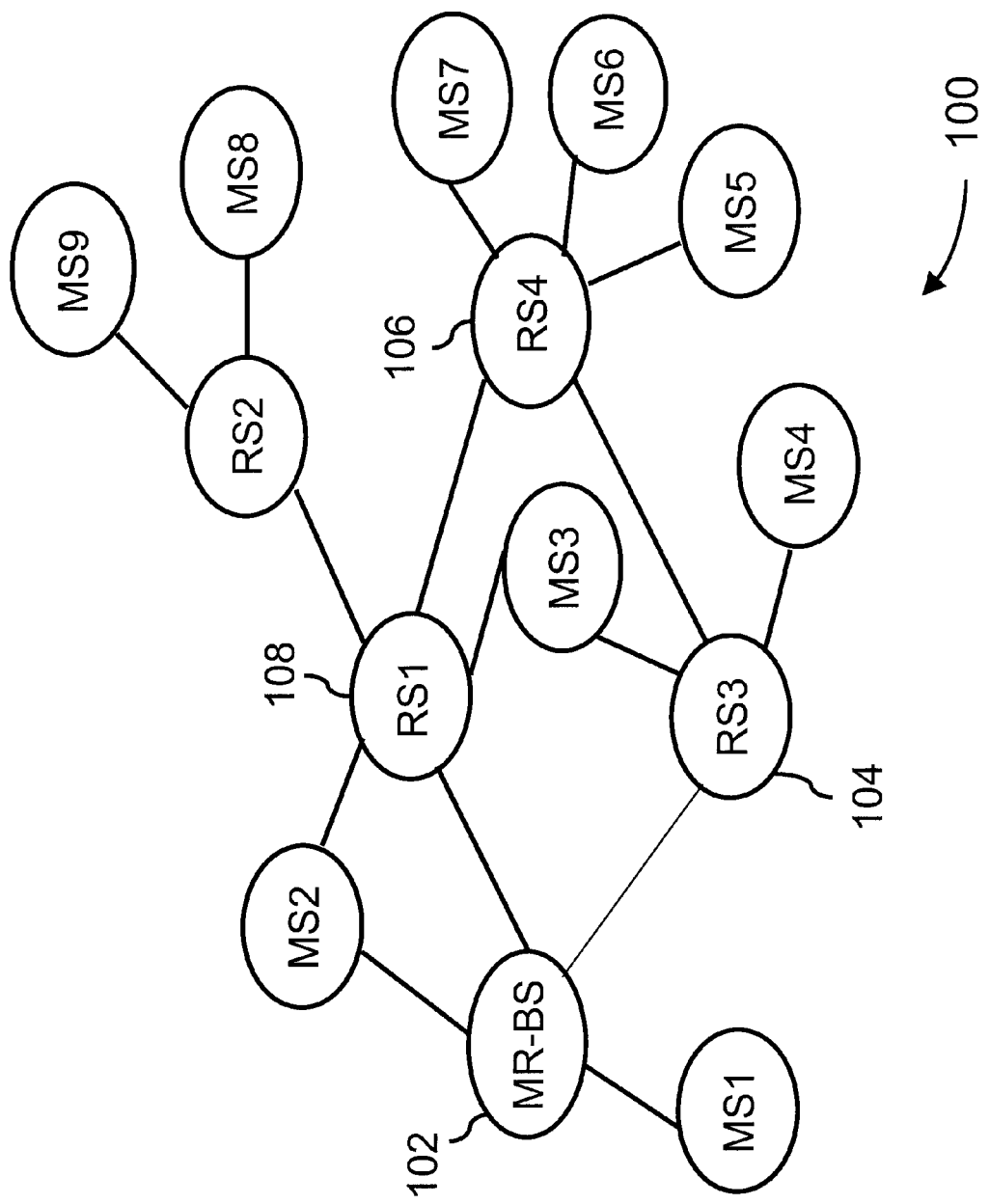
FIG. 1 is a block diagram of a multi-hop relay network.
Figure 2A:
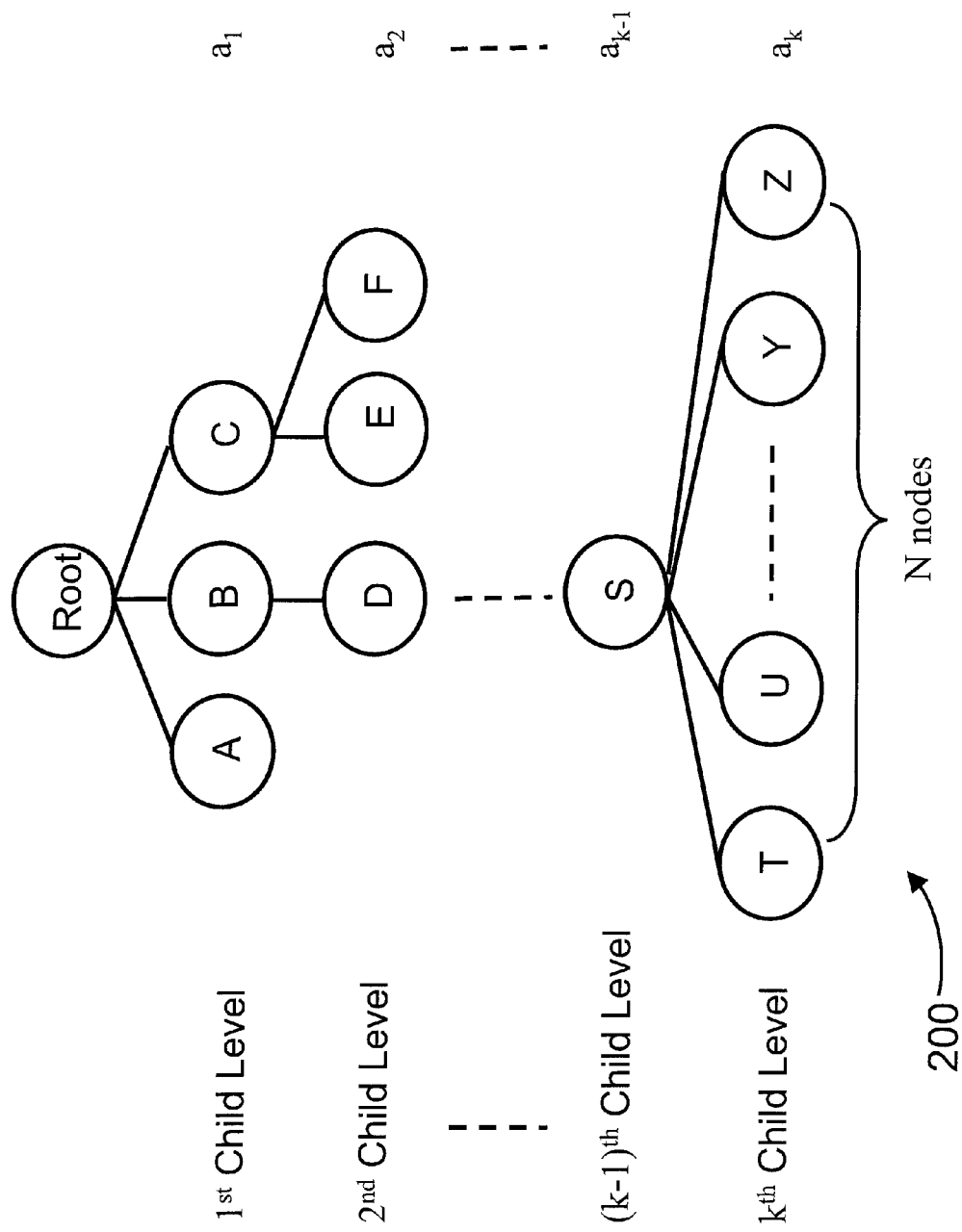
FIG. 2a illustrates a schematic exemplary example of a logical tree topology.

As illustrated in FIG. 2*a*, child nodes of node S are connected to form the $k^{th}$ child level of the tree topology and N child nodes are connected to Node S. In one exemplary embodiment consistent with the invention, the identification $a_k$ of each of the child nodes of node S could be assigned a number selected within 1 to N. One of the implementation could be to assign N as identification $a_k$ of node T, N−1 as identification $a_k$ of node U, . . . , 2 as identification $a_k$ of node Y and 1 as identification $a_k$ of node Z.

In another exemplary embodiment consistent with the invention, the identification $a_k$ each of the child nodes of node S could instead be assigned a number selects within 0 to N−1, for example, identification $a_k$ of node T is assigned as 0, identification $a_k$ of node U is assigned as 1, . . . , identification $a_k$ of node Y is assigned as N−2 and identification $a_k$ of node Z is assigned as N−1. In this example, the identification $a_1$ of $1^{st}$ child level is assigned from 1 to N−1, and the determined number N is $2^i$, where i is an integer equal to or greater than 0.

The root node or at least one of some other nodes with control capability or a child node may store information to generate the node IDs, and manage data forwarding or network configuration. For example, such information may include: the determined number N, a maximum child node number of a parent node in a logical tree topology, an integer i in the implementation of $N=2^i$, identification $a_k$ of the child node, the child level k of the child node, a set of identification $\{a_1, a_2, \ldots, a_{k-1}\}$ along a parent-child path from the first child level of the root node to the child node, and a maximum child level H of the logical tree. Other information or parameters could also be provided, and the kind of information to be stored optionally depends on the implementation.

Embodiments of the present invention may be practiced in any network communication system. For exemplary purposes, in the following paragraphs, multi-hop relay networks are described as exemplary communication systems to demonstrate data transmitting algorithms for generating a node ID in a communication network environment in which there is a determined number N of nodes, wherein the node IDs are utilized to transmit data.

Figure 3:
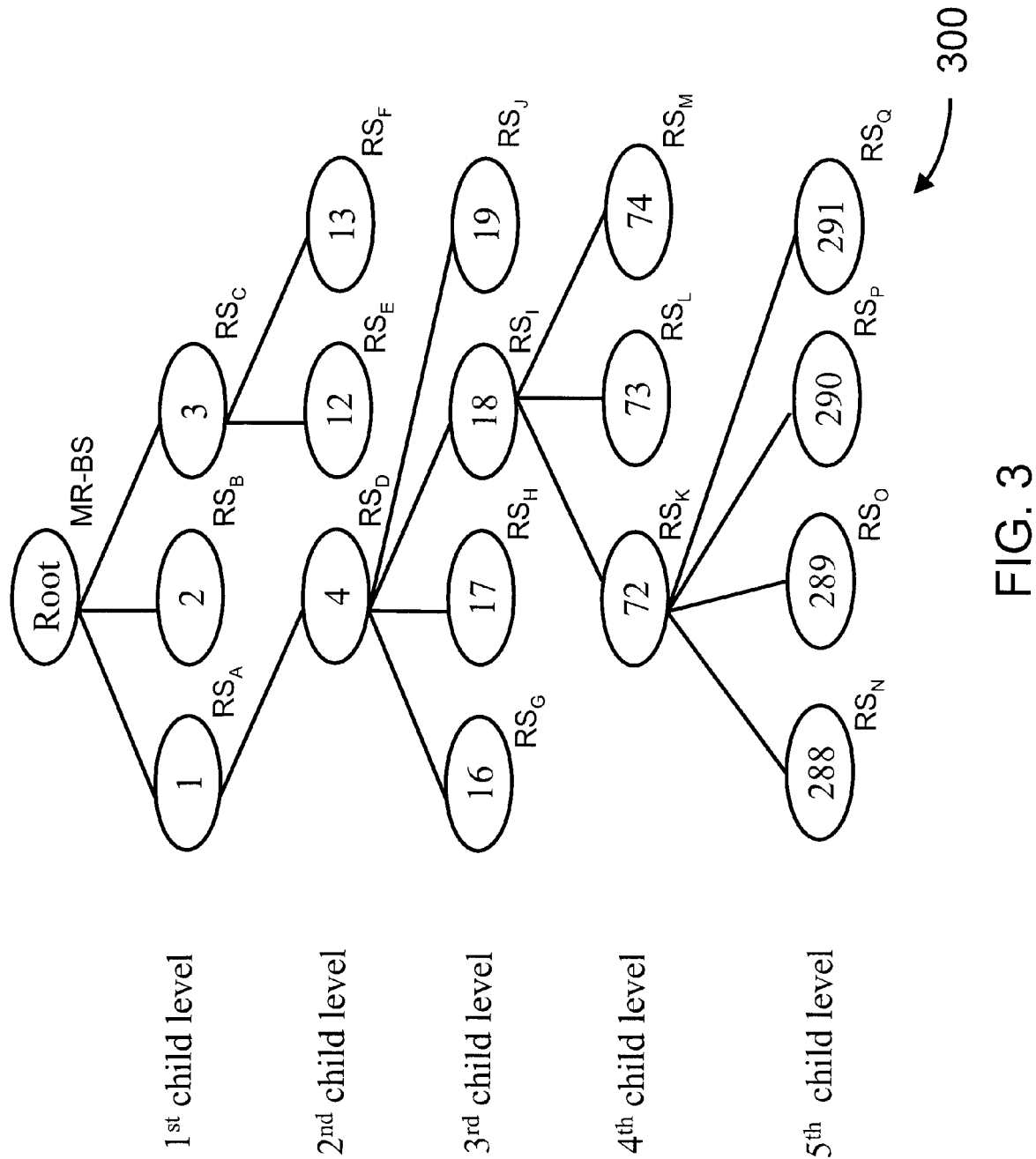
FIG. 3 illustrates an exemplary network node ID assignment of a communication system consistent with certain disclosed embodiments.

The node ID of each child node may be generated by a 2's carry operation, as explained in the following paragraphs. FIG. 3 illustrates an exemplary multi-hop relay network 300 that includes a multi-hop relay base station (MR-BS) and multiple relay stations (RSs). Mobile stations (MSs, not shown in figure) may be associated with either MR-BS or RS.

Network 300 is configured to have a logical tree topology including a MR-BS root node 302 having five child levels. The first child level contains child nodes $RS_A(a_1=1, ID=1)$, $RS_B(a_1=2, ID=2)$ and $RS_C(a_1=3, ID=3)$. The second child level contains nodes: $RS_D(a_2=0, ID=4)$ which is a child node of $RS_A$, and $RS_E(a_2=0, ID=12)$ and $RS_F(a_2=1, ID=13)$ which are child nodes of node $RS_C$. The third child level contains the following child nodes of $RS_D$: $RS_G(a_3=0, ID=16)$, $RS_H(a_3=1, ID=17)$, $RS_I(a_3=2, ID=18)$, and $RS_J(a_3=3, ID=19)$. The fourth child level contains three child nodes of ode $RS_I$: $RS_K(a_4=0, ID=72)$, $RS_L(a_4=1, ID=73)$, and $RS_M(a_4=2, ID=74)$. The fifth child level contains four child nodes of node $RS_K$: $RS_N(a_5=0, ID=288)$, $RS_O(a_5=1, ID=289)$, $RS_P(a_5=2, ID=290)$, and $RS_Q(a_5=3, ID=291)$.

In the configuration of network 300, i=2 so that the determined number $N=2^i$ of child nodes is $2^2=4$, the maximum child level H is 5, and the identification $a_k$ of each of the nodes of the first child level (k=1) is a sequentially assigned integer from 1 to 3. Relative to each parent node, the identification $a_k$ of each of the nodes of other child levels is a sequentially assigned integer from 0 to 3 in this exemplary example.

Figure 4:
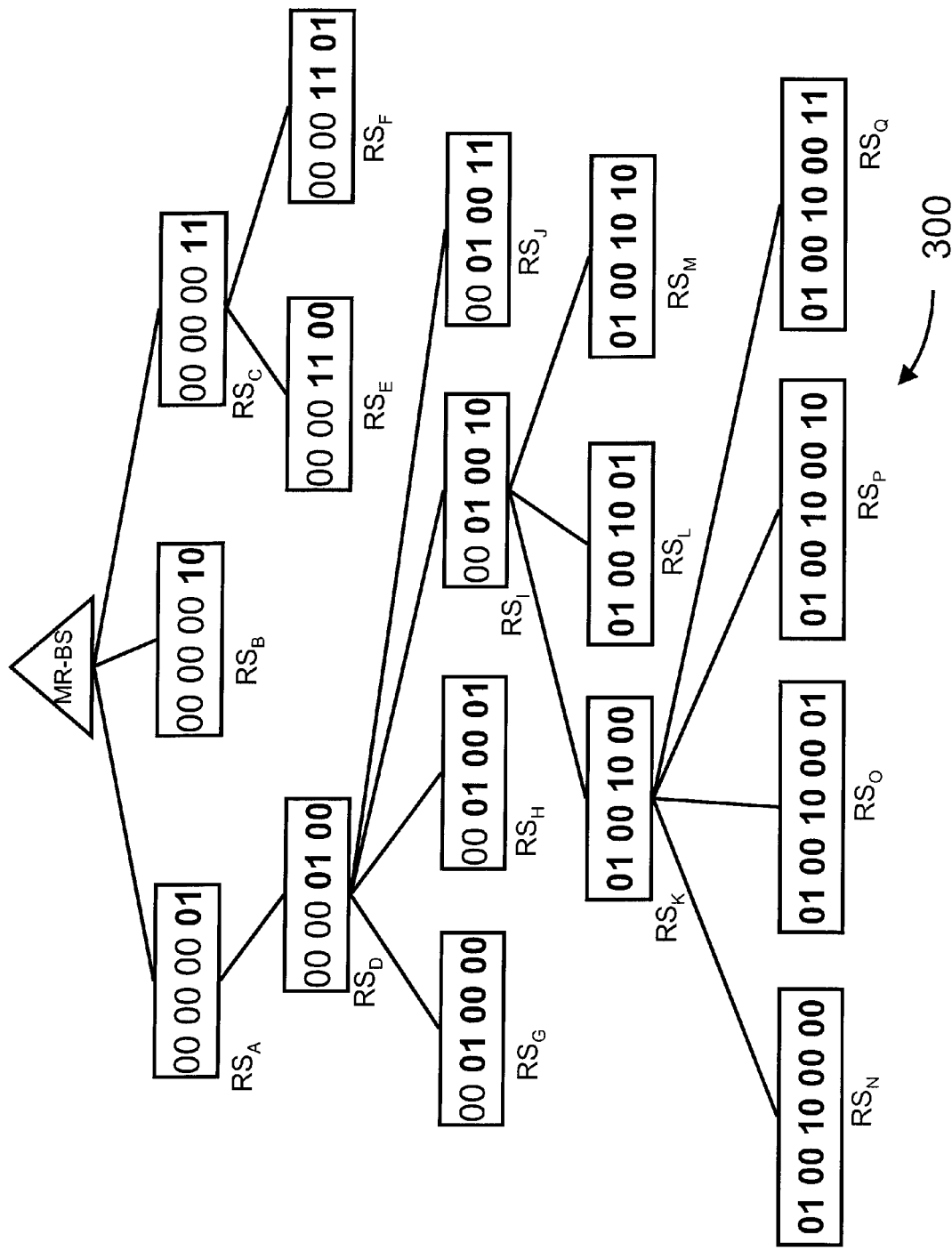
FIG. 4 illustrates an ID assignment operation by expanding the node IDs assigned in FIG. 3 with binary form.

FIG. 4 illustrates network 300 in which node IDs are represented in binary notation. By converting the node ID of each of the child nodes of the logical tree topology of network 300 into binary notation, it becomes possible to perform a 4-carry operation to generate the node IDs of network 300. Moreover, the computations of node ID assignments may be accomplished by bit operations.

With reference to FIG. 4 and as an exemplary implementation consistent with embodiments of the invention, the node IDs of the first child level nodes are assigned by an integer selected within 1 to $2^i-1$ by setting different values of the lowest i bits of each node ID. For the nodes of other child levels, a control node, MR-BS for example, left shifts i bits of the parent node ID of each child and sets different values of the lowest i bits by selecting an integer within 0 to $2^i-1$. This process could be used to generate the node IDs for newly arriving nodes or for connecting the child nodes RS. For example, it is assumed that nodes $RS_I$ and $RS_J$ newly arrive one after another to associate with node $RS_D$ (ID=00 00 01 00) as their parent node, after arrival of nodes $RS_G$ and $RS_H$ in FIG. 4. To assign an ID to $RS_I$, control node MR-BS left shifts 2 bits of its own ID, as a parent node, resulting in 00 01 00 00, and sets the lowest 2 bits as 10 since node $RS_I$ is the third node that attaches to $RS_D$, resulting in 00 01 00 10. Similarly, node MR-BS assigns 00 01 00 11 to node $RS_J$ after assigning the ID to node $RS_I$. Using a similar manner (not shown in the figure), the node IDs of the first child level nodes could also be assigned by an integer by setting different values of the highest i bits of each node ID. While for the nodes of other child levels, a control node, MR-BS for example, right shifts i bits of the parent node ID of each child and sets different values of the highest i bits by selecting an integer within 0 to $2^i-1$.

Referring again to FIG. 3, in another exemplary embodiment, each child node may assign an identification $a_k$, and a node ID of each of the nodes of the first child level may assign its own identification $a_1$. The node ID of each of nodes of other child levels is assigned by performing an operation of left shifting i bits of the parent node ID of each of the child nodes and setting the lowest i bits to the identification $a_k$ of each of the child nodes. For example, in FIG. 3 $RS_I$ and $RS_J$ are associated with a common parent node $RS_D$ (ID=4) (00 00 01 00). To assign an ID to $RS_I$, the MR-BS perform a left shift of 2 bits of the ID of the parent node $RS_D$ and adds binary "10" (decimal 2, its identification $a_3$) resulting in decimal 18. Similarly, node ID 19 of $RS_J$ is generated by left shifting 2 bits of the parent node ID and adding 3, it's $a_3$ identification.

Figure 5:
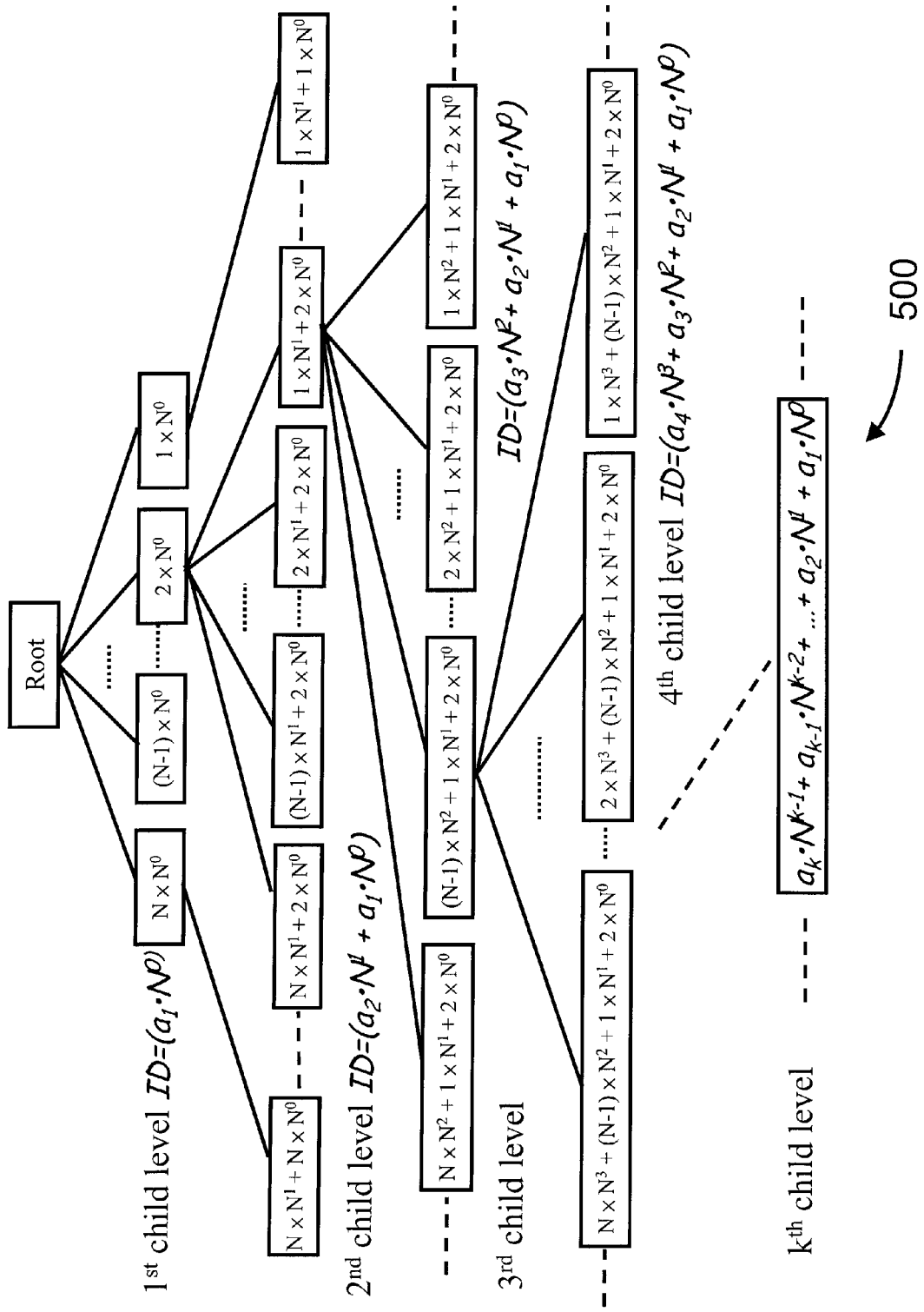
FIG. 5 illustrates another exemplary network node ID assignment of a communication system utilizing an N-carry operation by a polynomial consistent with certain disclosed embodiments.

The operation of assigning identifications of the child nodes could be an N-carry operation. FIG. 5 illustrates an exemplary embodiment of an N-carry operation as a polynomial. With reference to FIG. 5, each child node of a $k^{th}$ child level of a tree topology of network nodes in a communication system 500 has a node ID=$(a_k \cdot N^{k-1}+a_{k-1} \cdot N^{k-2}+ \ldots +a_2 \cdot N^1+a_1 \cdot N^0)$. The node ID of each child node of the first child level is generated by a polynomial $(a_1 \cdot N^0)$, the node ID of each child node of the second child level is generated by a polynomial $(a_2 \cdot N^1+a_1 \cdot N^0)$, the node ID of each child node of the third child level is generated by a polynomial $(a_3 \cdot N^2+a_2 \cdot N^1+a_1 \cdot N^0)$, and the node ID of each child node of the fourth child level is generated by a polynomial $(a_4 \cdot N^3+a_3 \cdot N^2+a_2 \cdot N^1+a_1 \cdot N^0)$. The previously described 2's carry operation illustrated by FIGS. 3 and 4 could also be expressed by the same polynomial form with $N=2^i$.

Figure 6:
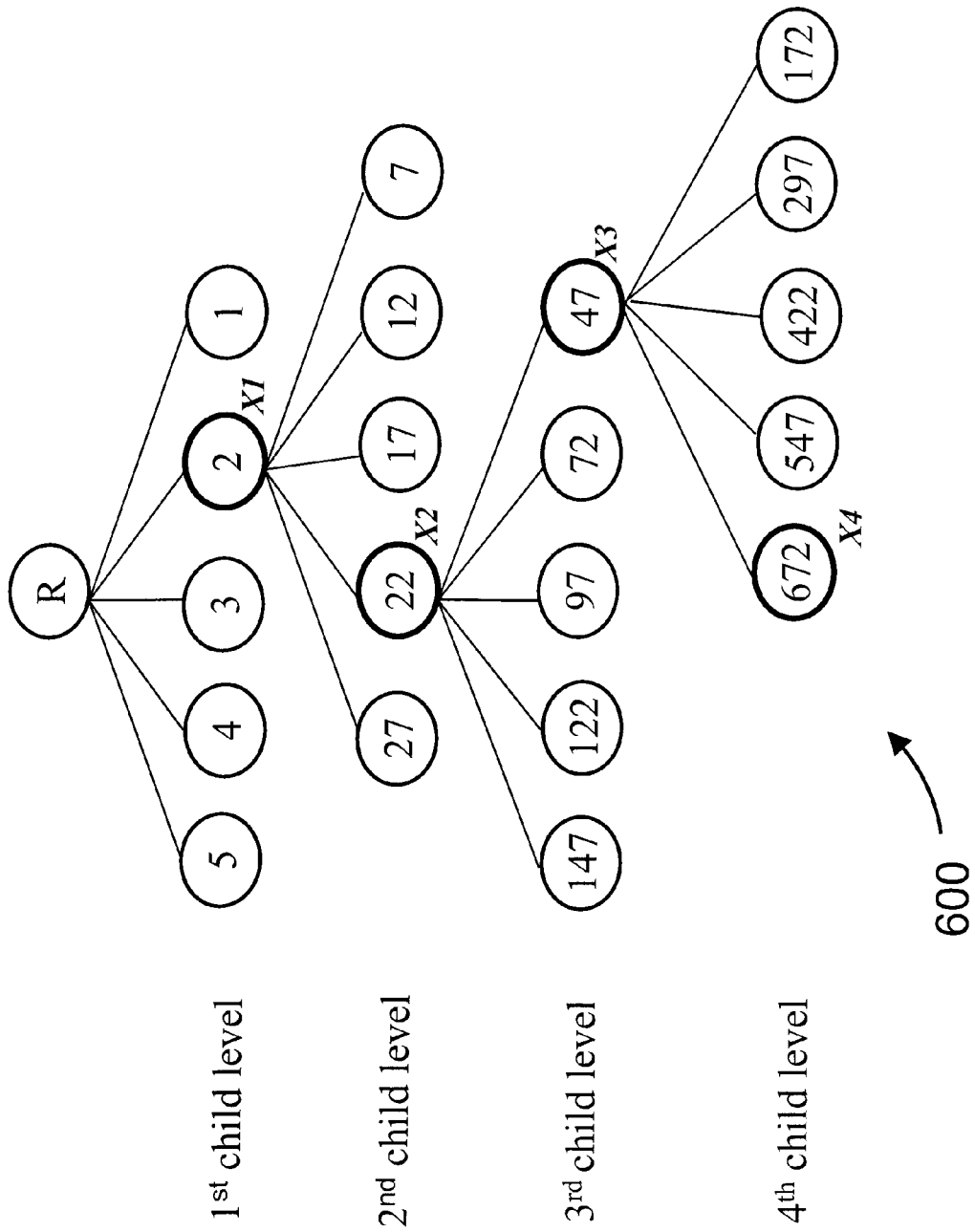
FIG. 6 further illustrates the exemplary N-carry operation node ID assignment of FIG. 5 consistent with certain disclosed embodiments.

FIG. 6 shows an exemplary embodiment of node ID assignment using an N-carry operation in a communication system having a logical tree topology 600 with N=5. The node ID of node X1 in the first child level is assigned to be 2, generated by $(2 \times 5^0=2)$. The node ID of node X2 of child level 1 is 22, generated by $(2 \times 5^0+4 \times 5^1=22)$. Following the same polynomial computation rule, nodes X3 and X4 are assigned 47 and 672, respectively, generated by $(2 \times 5^0+4 \times 5^1+1 \times 5^2=47)$ and $(2 \times 5^0+4 \times 5^1+1 \times 5^2+5 \times 5^3=672)$ respectively. The N-carry operation of child nodes of the $k^{th}$ child level is performed by adding $a_k \cdot N^{k-1}$ to the parent node ID.

By use of the illustrated node ID assignment embodiments, during a data routing process, data could be transmitted by utilizing the node IDs of child nodes. When forwarding data, a destination node ID of the data is checked against the node ID of each child node, and each child node accepts the data for further processing if the destination node ID is the node ID of each such child node; and decides to forward the data to subordinate child nodes or to discard the data depending on whether the destination node ID is not the node ID of the child node.

Figure 7:
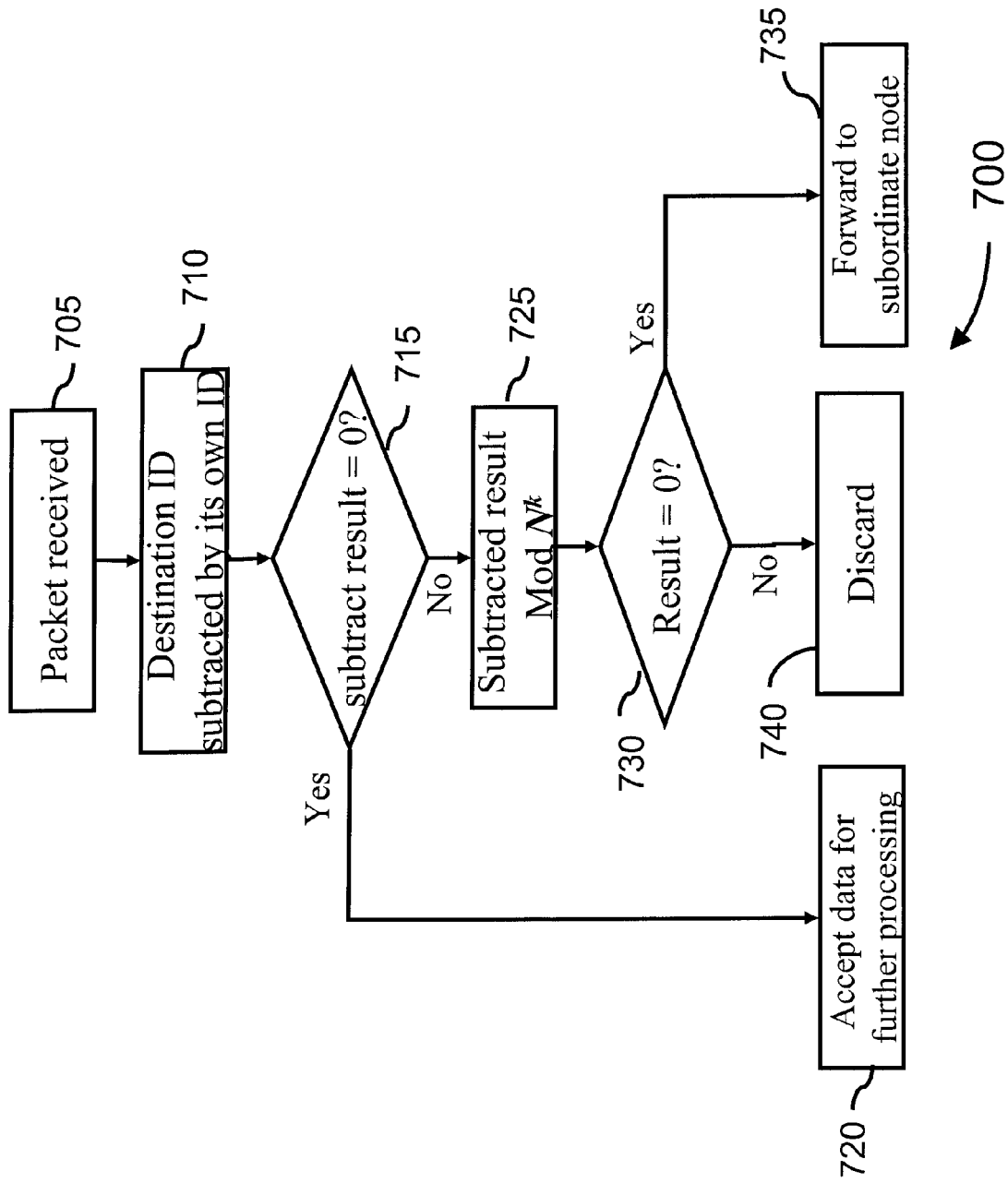
FIG. 7 is a flow chart illustrating an exemplary process for data forwarding in a communication system.

FIG. 7 is a flowchart illustrating an exemplary example of data transmission in a communication system. Each time a node receives a data packet having a destination node ID (step 705), the receiving node subtracts its own node ID from the destination node ID (step 710). If the subtraction result equals 0 (step 715, yes), the node accepts (receives) the data packet for further processing (step 720). If the subtraction result is not 0 (step 715, no), the subtraction result is subjected to a modulo $N^k$ operation (step 725). If the result of the modulo operation equals 0 (step 730, yes), the node forwards the data to its subordinate child nodes (step 735). Otherwise (step 730, no), the data is discarded (step 740).

Referring again to FIG. 6, tree topology 600 is used to explain a data forwarding example for a data packet destined for node X4 having ID 672. When node X1 receives the packet, ID 672 is subjected to subtraction by 2. Because the subtraction result is not equal 0, node X1 determines that is not the destination of the packet and subjects the subtraction result to the modulo $N^k$ operation. After the calculation, the modulo result is 0 so that node X1 forwards the packet to subordinate nodes. The same process is executed in nodes X2 and X3. When node X4 receives the forwarded data packet, it subtracts its ID from the node ID of the packet. The subtraction result is 0, so node X4 receives the packet for further processing. When the other child nodes receive the forwarded data packet, after the modulo calculation, the modulo result is not 0 so these nodes discard the data packet.

With the routing-embedded ID assignment illustrated with FIG. 4, each RS may determine its level and perform forwarding of data packets efficiently. For upstream frames, each RS may readily determine its parent ID by right shifting i bits of its own ID. For example, the ID of $RS_M$ is 01 00 10 10, so that $RS_M$ knows the ID of its parent node $RS_I$ is 00 01 00 10 by right shifting 2 bits of its ID. For downstream frames received from its parent node, the child node needs to determine if it should accept, forward, or discard the frame, such as in accordance with the process shown in FIG. 7.

Figure 8:
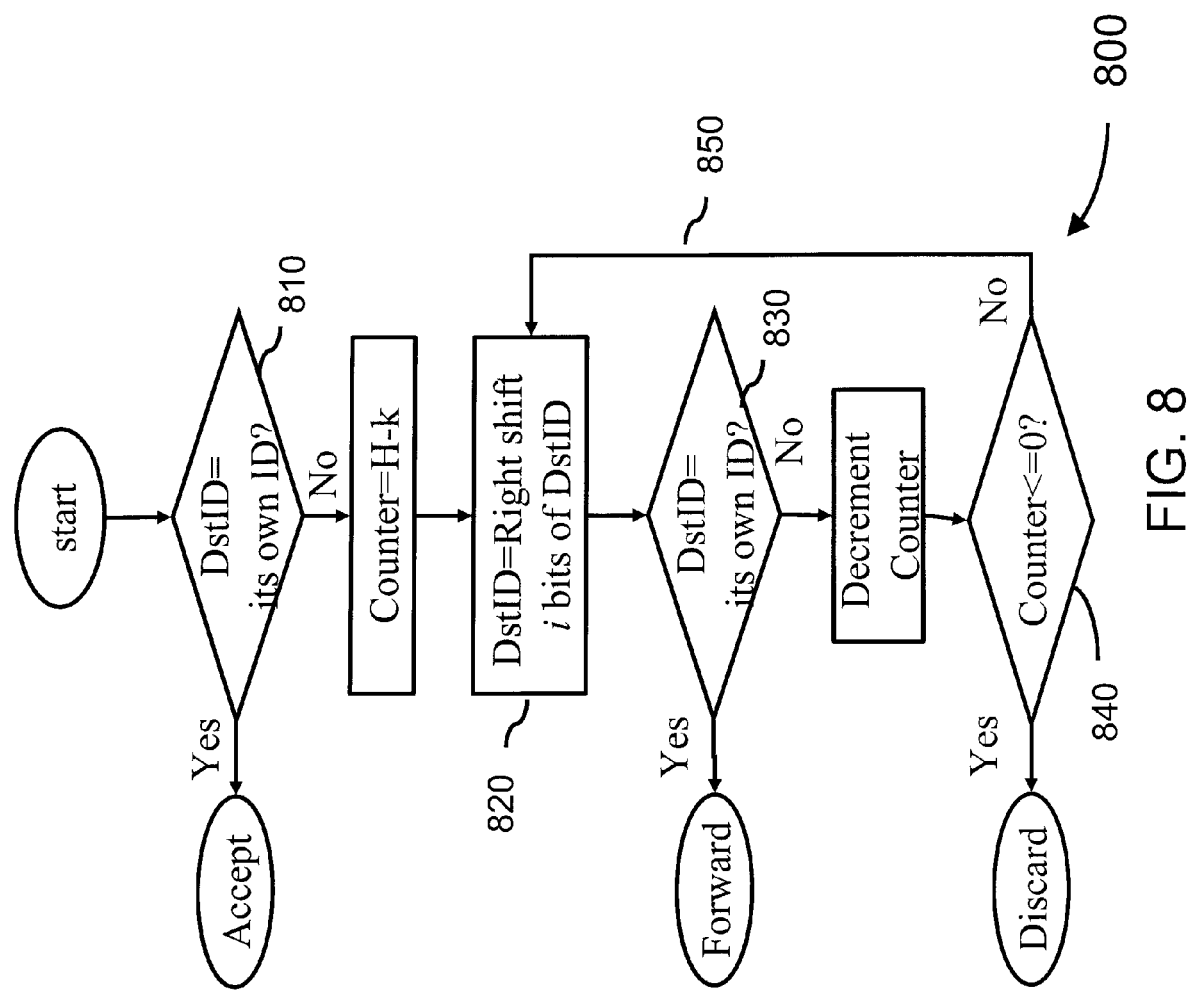
FIG. 8 is a flow chart illustrating another exemplary process for data forwarding in a communication system.

FIG. 8 illustrates a flowchart for a data transmitting process consistent with the exemplary embodiment of the invention illustrated in FIG. 4, the node IDs of child nodes are assigned by left shifts i bits of the parent node ID of each child and setting different values of the lowest i bits of each node ID, wherein $N=2^i$. A node receiving a data packet checks if the destination node ID of the packet is equal to its own ID (step 810) and accepts the frame if these two IDs are the same (step 810, yes). If the two IDs are not the same, the node performs an i-bit right shift of the destination node ID (step 820) and checks the result against its own ID (step 830). If the shifted destination node ID is the same as the node's own ID, the node forwards the frame to its subordinate child node (step 830, yes). Otherwise, it continues to right shift and check (step 820, 830) j times (step 840, 850), where j=(H−k), where H is the maximum number of child levels and k is the child level of the data transmitting node. The node discards the frame if all checks fail (step 840, yes). Similarly, when the node IDs of the child nodes are assigned by right shifts i bits of the parent node ID of each child and setting different values of the highest i bits of each node ID, during the data transmitting process, the step 820 performs left shift instead of right shift and the other steps remain the same procedure.

When nodes enter and leave a communication system, the network topology could be changed accordingly, and node IDs may need to be updated as a consequence of the possible change of allowable connected child nodes at any child level in the logical tree topology. For example in some implementation the network identifies the maximum number of child nodes, broadcasts or forwards the maximum number, and updates the node ID of each of the child nodes.

A root node or another designated node with network control capability may process the identifying and broadcasting/forwarding, and each of the child nodes may update its own ID based on the broadcasted or forwarded information to generate the node ID, for example by identifying a set $\{a_1, a_2, \ldots, a_k\}$ or based on decoding its own old node ID, for example, by bit shifting the old node ID. The information could be stored in the child node or forwarded by at least one node with network control capability during a broadcasting or forwarding process.

Figure 2B:
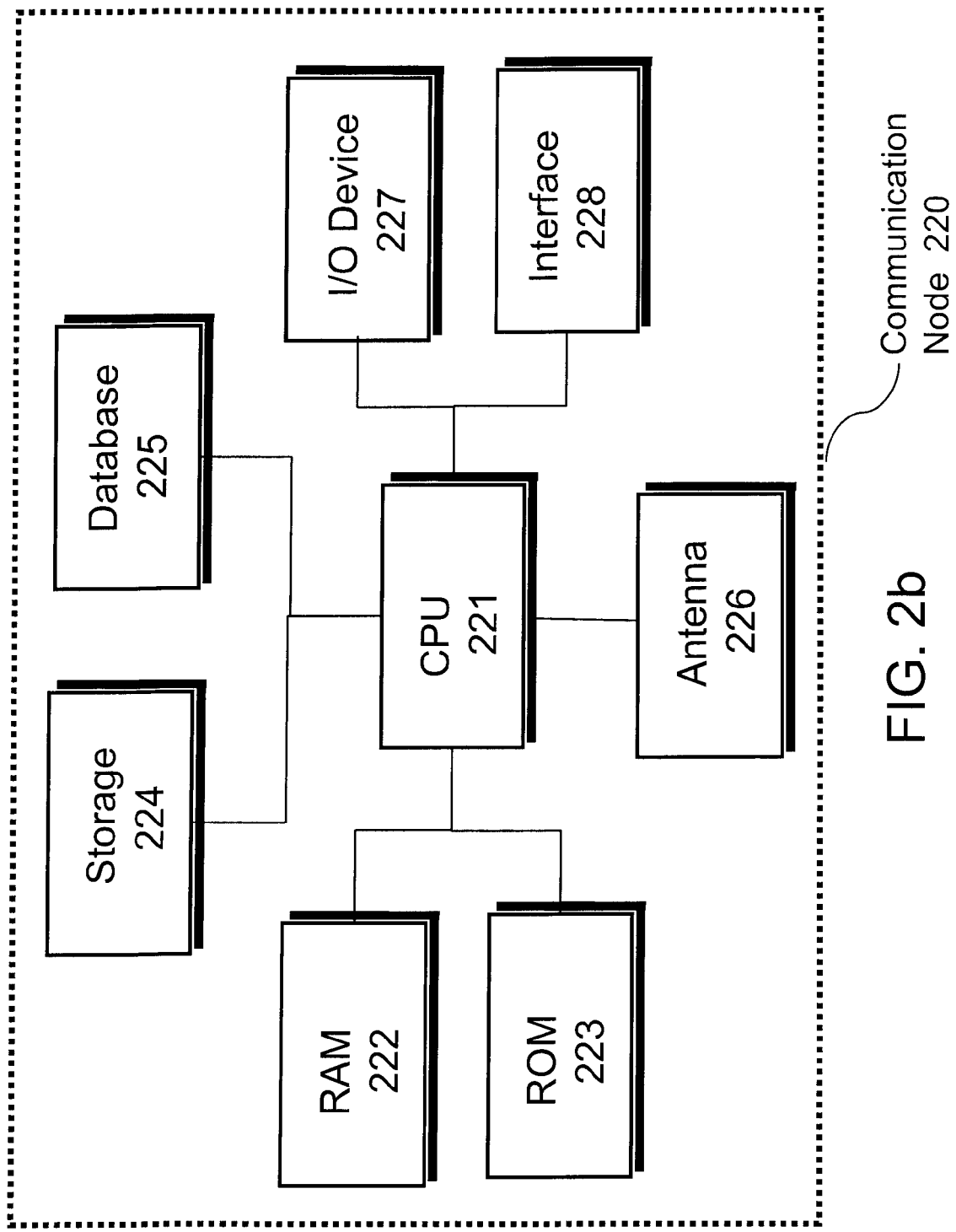
FIG. 2b illustrates an exemplary example of block diagram of a communication node.

As shown in FIG. 2b, a communication node 220 of the network system the invention disclosed may include one or more of the following components: at least one central processing unit (CPU) 221 configured to execute computer program instructions to perform various processes and methods, random access memory (RAM) 222 and read only memory (ROM) 223 configured to access and store information and computer program instructions, memory 224 or one or more databases 225 to store information and data, one or more antenna 226, one or more I/O device 227 and one or more Interface 228, etc. Each of these components is well-known in the art and will not be discussed further.

Figure 9:
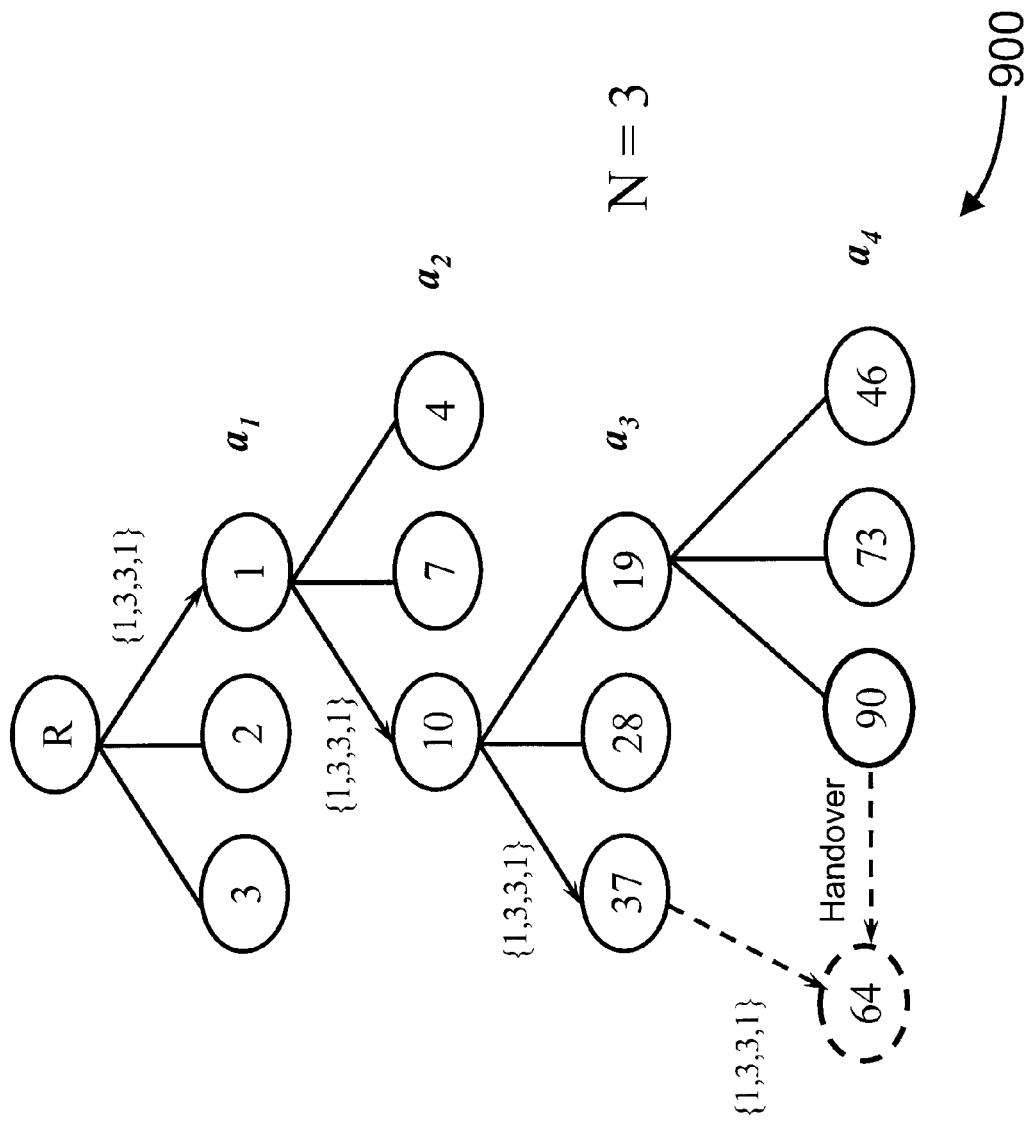
FIG. 9 is a schematic diagram illustrates a handover of a network node.

FIG. 9 illustrates an exemplary network 900 which illustrates a node handover from a parent node to another node. The root node or another node has control capability to forward to the handover node its new information for generating a node ID, for example $\{a_1', a_2', \ldots, a_k'\}$. After receiving the information, the handover node may generate the new node ID. In FIG. 9, the node with ID 90 decides to handover from parent node 19 to another parent node 37. The root node forwards new information, e.g., $\{1, 3, 3, 1\}$, to the handover node. As a result, the handover node may update its new node ID during or after the handover process.

Figure 10A:
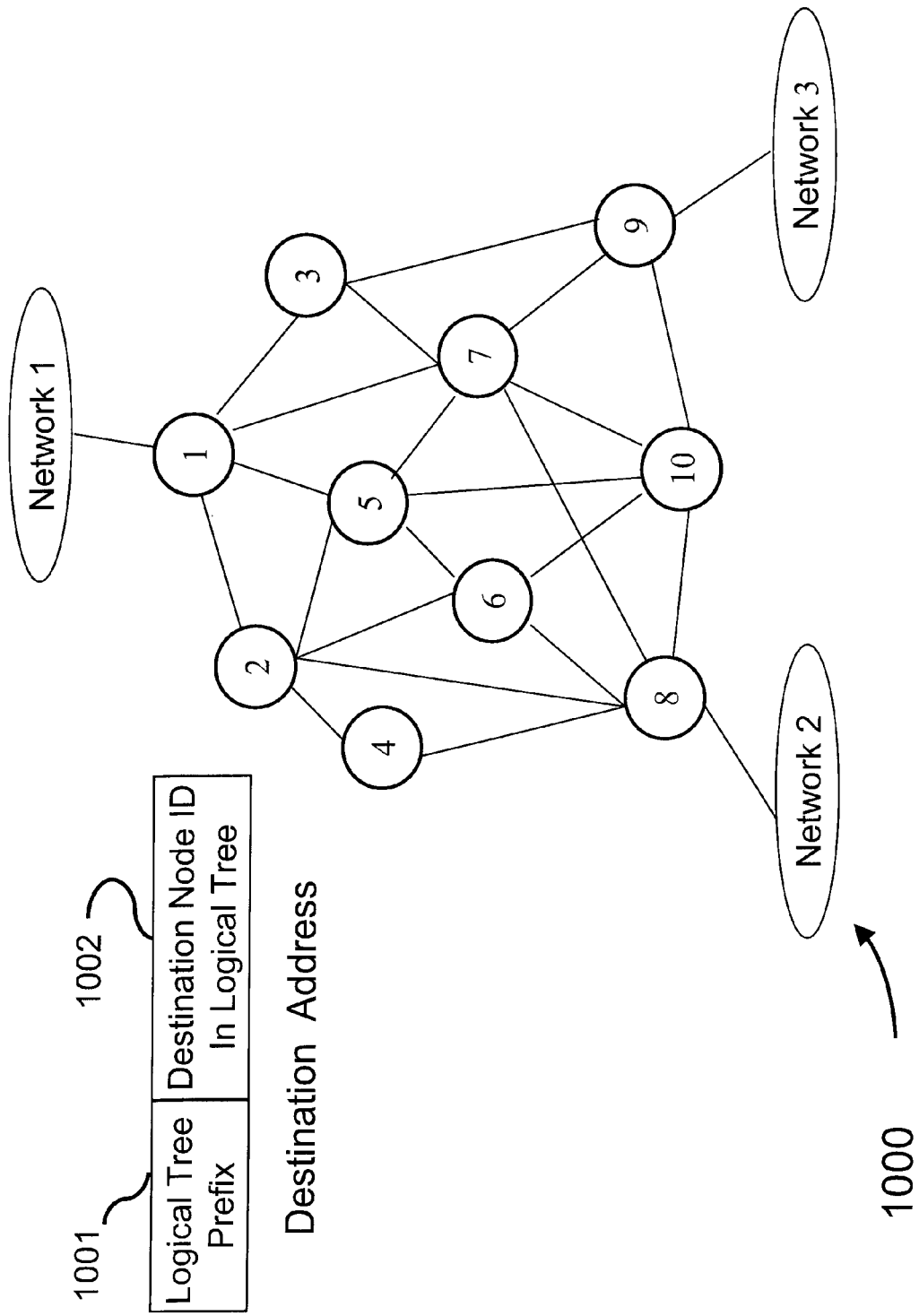
FIG. 10*a* is a schematic diagram illustrates a mesh topology network.
Figure 10B:
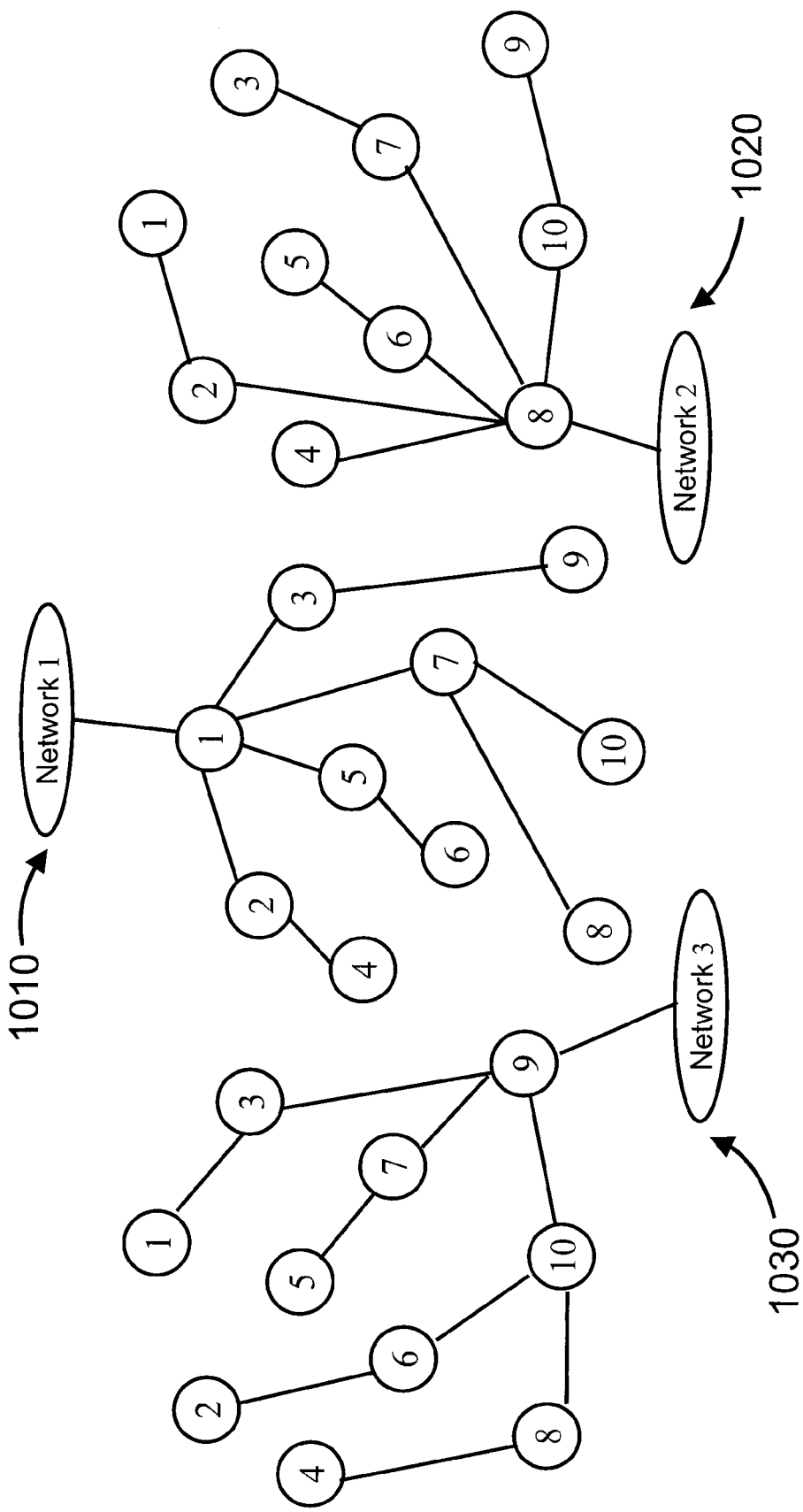
FIG. 10*b* is a schematic diagram illustrates logical trees formed in the mesh network of FIG. 10*a*.

FIG. 10a is an example of a mesh topology network 1000 mapped to logical trees consistent with embodiments of the invention. FIG. 10b illustrates three logical trees formed in network 1000 with connecting nodes. The three logical trees are logical tree 1 (1010) having node 1 as a root node, logical tree 2 (1020) having node 8 as a root node, and logical tree 3 (1030) having root node 9 as a root node. In general, the gateway to an external network is taken as the root node in a logical tree network.

When forwarding a packet in the logical tree network, the packet may include a destination address including at least a logical tree prefix field 1001 and a destination node ID field 1002 as illustrated in FIG. 10a. A node that receives a packet with a destination address assigns a logical tree prefix to forward the data. For example, in order for node 4 to transmit a packet to node 9 using logical tree 1 (1010), node 4 assigns 1 to the logical tree prefix field, and allocates the ID of node 9 of logical tree 1 to the destination node ID field of the destination address.

Figure 11:
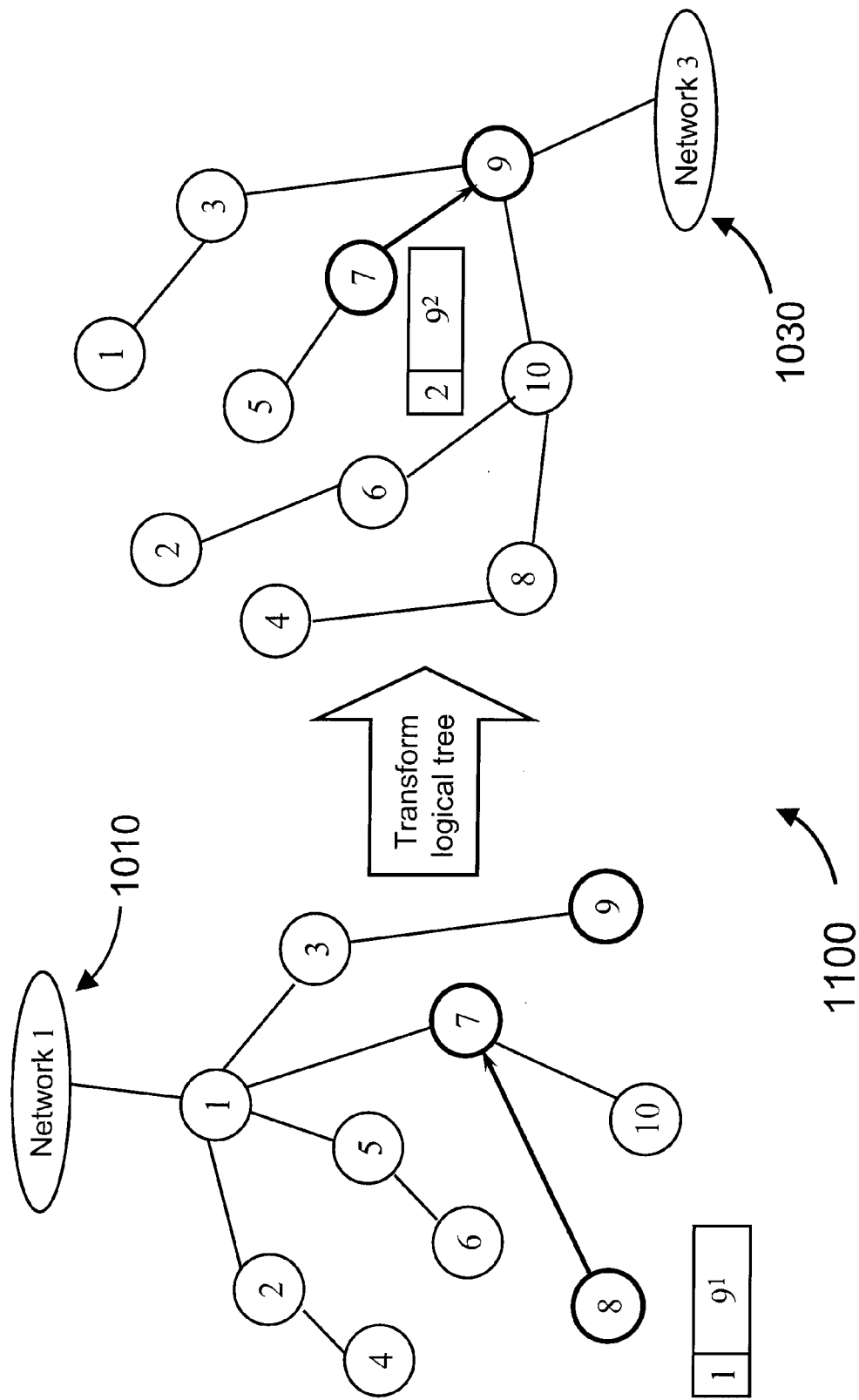
FIG. 11 is a schematic diagram illustrates inter logical tree data transmitting.

For forwarding packets between logical trees, due to the different prefixes and node IDs in different logical trees, each node may transform a destination address by modifying the prefix and node ID. FIG. 11 shows an exemplary schematic diagram 1100 illustrating transmission of data between logical trees. In order for node 8 to send a packet to node 9, node 8 inserts the logical tree prefix field 1 and inserts the node ID of node 9 in logical tree 1 as the destination node ID field, and forwards the packet via logical tree 1. When receiving the packet, node 7 decides to forward the packet via logical tree 2, by utilizing a conventional algorithm to make that decision. Node 7 changes the logical prefix field to 2, and transforms the node ID of node 9 in logical tree 1 (represented by the notation $9^1$) into the node ID of node 9 in logical tree 2 ($9^2$). The packet is forwarded to node 9 using the node ID $9^2$ and the data transmitting algorithm of logical tree 2. In this manner, the system may assign a different logical tree prefix value and transform the destination node ID in original logical tree to the node ID in the assigned logical tree, to transmit data utilizing one or more logical trees.

Figure 12:
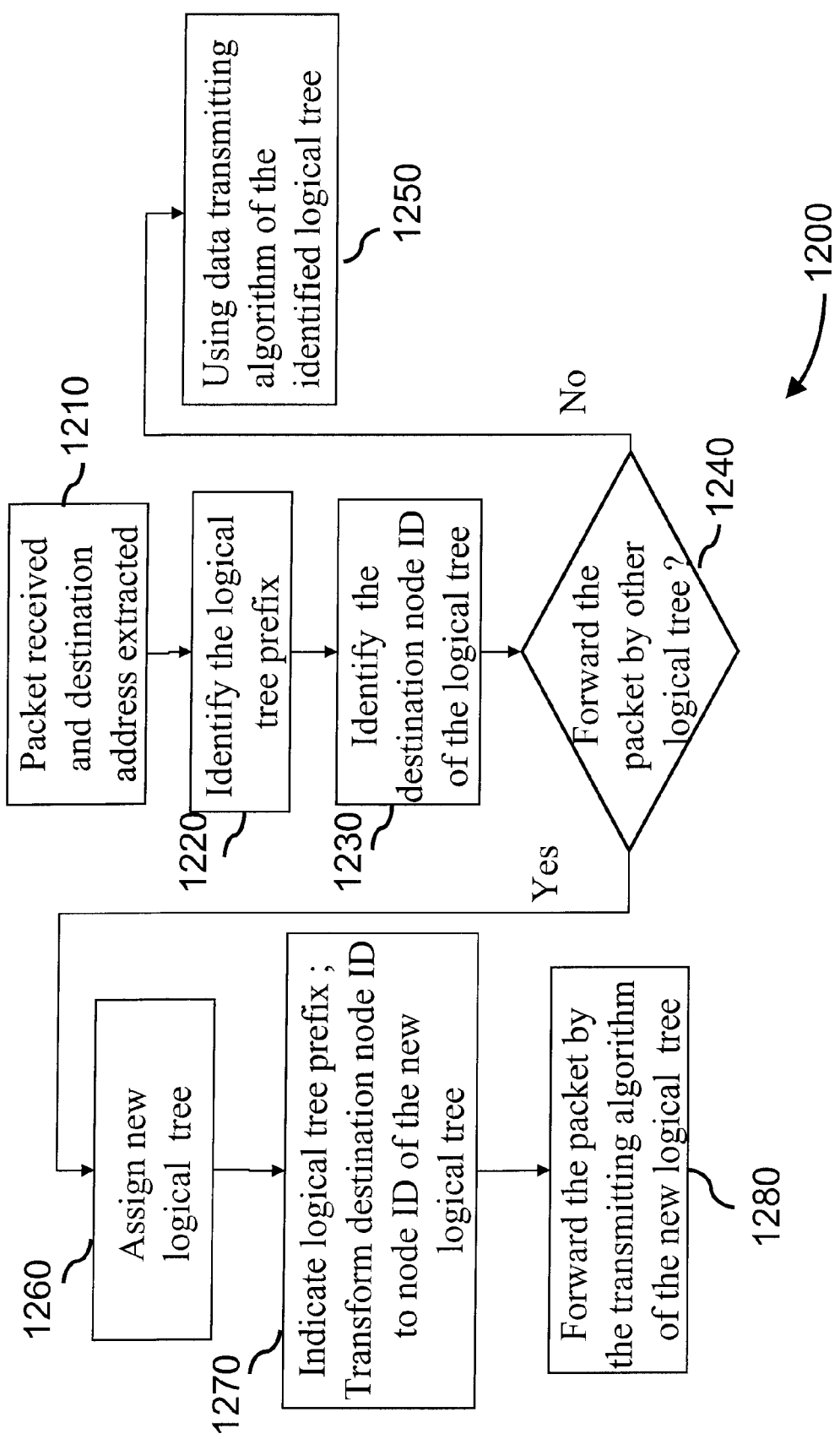
FIG. 12 is an exemplary flow chart of a data transmitting consistent with embodiments of the invention.

FIG. 12 illustrates an example of a data transmitting flow chart. When a network node receives a packet and extracts the destination address of the packet (step 1210), it identifies the logical tree prefix (step 1220) and identifies the destination node ID of the logical tree (step 1230). After identifying the destination node ID, the receiving node decides whether to forward the packet to another logical tree or not (step 1240). The receiving node may uses any conventional or any of previous described data transmitting methods base on assigning node ID (data transmitting algorithm) of the identified logical tree (step 1250), if not forwarding the packet by another logical tree (step 1240, No). If the node decides to forward the packet by another logical tree (step 1240, Yes), the node indicates a new logical tree in the logical tree prefix field and transforms the destination node ID into the node ID of the new logical tree (step 1270) after the new logical tree is assigned by some algorithm (step 1260). The packet is forwarded via the new path by utilizing the data transmitting algorithm of the new logical tree (step 1280).

It will be apparent to those skilled in the art that various modifications and variations may be made in the system and method for reducing signal interference in communication networks. It is intended that the standard and examples be considered as exemplary only, with a true scope of the disclosed embodiments being indicated by the following claims and their equivalents.

What is claimed is:

1. A method for transmitting data in a network having a plurality of communication nodes, the nodes functioning as transmission nodes and receiving nodes, the method comprising:

assigning a node ID for a receiving node in a transmission-receiving group, among the plurality of communication nodes, by an N-carry operation of a determined number N; and transmitting data from at least one transmission node in the transmission-receiving group to at least one receiving node in the transmission-receiving group by utilizing the node ID, wherein the N-carry operation is based on a polynomial that includes a multiplication of an exponential value based on the determined number N and each one of a set of identifications of receiving nodes along a transmission-receiving path, the set of identifications each being one of an intra-level sequential identifier and a parent node intra-level sequential identifier, the transmission-receiving path being from a first receiving level of a first level transmission node to the receiving node for which the node ID is assigned.

2. The method as in claim 1, further including designating communication nodes of the transmission-receiving group as a root node and one or more child nodes to form a logical tree topology, wherein each of the child nodes is a parent node of 0, or of one or more other child nodes.

3. The method as in claim 2, wherein the determined number N is the maximum number of child nodes connecting to each of the nodes of the logical tree topology.

4. The method as in claim 2, further including assigning, for each parent node, an identification $a_k$ for each of the child nodes, in a $k^{th}$ child level of the logical tree topology, for parent nodes to identify said child nodes.

5. The method as in claim 4, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $\{a_1, a_2, \ldots, a_{k-1}, a_k\}$ is a set of identifications of child nodes along the transmission-receiving path from a first child level of the root node to a child node for which the node ID is being assigned.

6. The method as in claim 1, further including assigning, for each transmission node, an identification $a_k$ for each of the receiving nodes, in a $k^{th}$ receiving level of the transmission-receiving group, for transmission nodes to identify said receiving nodes.

7. The method as in claim 6, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $\{a_1, a_2, \ldots, a_{k-1}, a_k\}$ is the set of identifications of receiving nodes along the transmission-receiving path from the first receiving level of the first level transmission node to said receiving node for which the node ID is assigned.

8. The method as in claim 1, wherein the determined number N is equal to $2^i$, i being an integer equal to or greater than zero.

9. The method as in claim 2, wherein the determined number N is equal to $2^i$, i being an integer equal to or greater than zero.

10. The method as in claim 9, wherein the determined number N is the maximum number of child nodes connecting to each of nodes of the logical tree topology.

11. The method as in claim 9, wherein the N-carry operation of child nodes in each child level other than the first child level is performed by left shifting i bits of a parent node ID and setting different values of lowest i bits of the shifted node ID for the respective child nodes of the child level, and assigning the node ID of each of nodes of the first child level nodes by setting different values of lowest i bits of the node ID of the respective first child level nodes.

12. The method as in claim 9, wherein the N-carry operation of child nodes in each child level other than the first child level is performed by left shifting i bits of the parent node ID and setting lowest i bits of the shifted node ID as an integer selected within 0 to $2^i - 1$, and assigning the node ID of each of nodes of the first child level nodes as an integer selected within 1 to $2^i - 1$.

13. The method as in claim 12, wherein the node ID of each of said child nodes is assigned according to a sequence in which the child node is associated with its parent node.

14. The method as in claim 9, wherein the N-carry operation of child nodes in each child level other than the first child level is performed by right shifting i bits of a parent node ID and setting different values of highest i bits of the shifted node ID for the respective child nodes of the child level, and assigning the node ID of each of nodes of the first child level nodes by setting different values of the highest i bits of the node ID of the respective first child level nodes.

15. The method as in claim 9, wherein the N-carry operation of child nodes in each child level other than the first child level is performed by right shifting i bits of the parent node ID and setting highest i bits of the shifted node ID as an integer selected within 0 to $2^i - 1$, and assigning the node ID of each of nodes of the first child level nodes by setting highest i bits to an integer selected within 1 to $2^i - 1$.

16. The method as in claim 15, wherein the node ID of each of said child nodes is assigned according to a sequence in which the child node is associated with its parent node.

17. The method as in claim 4, further including assigning to the identification $a_k$ a number selected within 1 to N.

18. The method as in claim 5, further including assigning to the identification $a_k$ a number selected within 1 to N.

19. The method as in claim 4, wherein the determined number N is equal to $2^i$, i being an integer equal to or greater than zero.

20. The method as in claim 19, further including assigning to the identification $a_k$ of each of nodes of a first child level an integer selected within 1 to N−1, and assigning to the identification $a_k$ of each of nodes of other child levels an integer selected within 0 to N−1.

21. The method as in claim 20, further including assigning to said identification $a_k$ of each of said child nodes according to a sequence in which the child node is associated with its parent node.

22. The method as in claim 20, wherein the N-carry operation of child nodes in each child level other than the first child level is performed by left shifting i bits of the parent node ID of each of said child nodes and setting lowest i bits of the shifted node ID to the identification $a_k$ of each of said child nodes, and assigning the node ID of each of the nodes of the first child level its own identification $a_1$.

23. The method as in claim 20, wherein the N-carry operation of child nodes in each child level other than the first child level is performed by right shifting i bits of the parent node ID of each of said child nodes and setting highest i bits of the shifted node ID to the identification $a_k$ of each of said child nodes, and assigning the node ID of each of the nodes of the first child level by setting highest i bits of the node ID of the respective first child level nodes its own identification $a_1$.

24. The method as in claim 5, wherein the determined number N is equal to $2^i$, i being an integer equal to or greater than zero.

25. The method as in claim 24, further including assigning to the identification $a_k$ of each of nodes of the first child level an integer selected within 1 to N−1, and assigning to the identification $a_k$ of each of nodes of other child levels an integer selected within 0 to N−1.

26. The method as in claim 25, wherein the N-carry operation of child nodes in each child level other than the first child level is performed by left shifting i bits of the parent node ID of each of said child nodes and setting the lowest i bits to the identification $a_k$ of each of said child nodes, and assigning the node ID of each of nodes of first child level its own identification $a_1$.

27. The method as in claim 25, wherein the N-carry operation of child nodes in each child level other than the first child level is performed by right shifting i bits of the parent node ID of each of said child nodes and setting highest i bits of the shifted node ID to the identification $a_k$ of each of said child nodes, and assigning the node ID of each of the nodes of the first child level by setting highest i bits of the node ID of the respective first child level nodes to its own identification $a_1$.

28. The method as in claim 1, wherein the transmitting further includes each node transmitting data checking a destination ID of the data with its own node ID, accepting the data for further processing if the destination ID is its own node ID.

29. The method as in claim 28, wherein the checking is performed by subtracting from the destination ID its own node ID.

30. The method as in claim 29, wherein the checking by each node transmitting data, if the destination ID is not its own node ID, further includes:
   forwarding the data to subordinate receiving nodes of the $k^{th}$ receiving level if the subtraction result is not zero and the subtraction result modulo $N^k$ is zero.

31. The method as in claim 30, wherein the checking by each node transmitting data, if the destination ID is not its own node ID, further includes:
   discarding the data if the subtraction result is not zero and the subtraction result modulo $N^k$ is not zero.

32. The method as in claim 5, wherein the transmitting further includes each node transmitting data checking a destination ID of the data with its own node ID, accepting the data for further processing if the destination ID is its own node ID.

33. The method as in claim 32, wherein the checking is performed by subtracting from the destination ID its own node ID.

34. The method as in claim 33, wherein the checking by each node transmitting data further includes:
forwarding the data to subordinate child nodes of the $k^{th}$ child level if the subtraction result is not zero and the subtraction result modulo $N^k$ is zero.

35. The method as in claim 34, wherein the checking by each node transmitting data further includes:
discarding the data if the subtraction result is not zero and the subtraction result modulo $N^k$ is not zero.

36. The method as in claim 11, wherein the transmitting further includes each node transmitting data checking a destination ID of the data with its own node ID, and accepting the data for further processing if the destination ID is its own node ID.

37. The method as in claim 36, wherein the checking by each node transmitting data, if the destination ID is not its own node ID, further includes:
right shifting the destination ID i bits;
checking the shifted ID, forwarding the data to subordinate child nodes if the shifted ID is its own node ID; and
repeating j times of the right shifting and checking of the shifted ID, j being equal to a difference between a maximum number of child levels and a child level of the data transmitting node.

38. The method as in claim 37, wherein the checking by each node transmitting data, if the destination ID is not its own node ID further includes discarding the data if the data is not forwarded.

39. The method as in claim 14, wherein the transmitting further includes each node transmitting data checking a destination ID of the data with its own node ID, and accepting the data for further processing if the destination ID is its own node ID.

40. The method as in claim 39, wherein the checking by each node transmitting data, if the destination ID is not its own node ID, further includes:
left shifting the destination ID i bits;
checking the shifted ID, forwarding the data to subordinate child nodes if the shifted ID is its own node ID; and
repeating j times of the left shifting and checking of the shifted ID, j being equal to a difference between a maximum number of child levels and a child level of the data transmitting node.

41. The method as in claim 40, wherein the checking by each node transmitting data, if the destination ID is not its own node ID further includes discarding the data if the data is not forwarded.

42. The method as in claim 1, further including assigning said node ID of each of said nodes of the transmission-receiving group by at least one of the plurality of communication nodes.

43. The method as in claim 1, further including assigning said node ID of each of said nodes of the transmission-receiving group by at least one of the plurality of communication nodes with network control capability.

44. The method as in claim 1, further including assigning said node ID of each of said nodes of the transmission-receiving group by each of said nodes of the transmission-receiving group themselves.

45. The method as in claim 1, further comprising:
identifying by at least one of the plurality of communication nodes, the determined number N; and
broadcasting or forwarding by at least one of the plurality of communication nodes, the identified number N to the transmission-receiving group.

46. The method as in claim 45, further including assigning the node ID of each of said nodes of the transmission-receiving group by at least one of the plurality of communication nodes.

47. The method as in claim 45, further including assigning said node ID of each of said nodes of the transmission-receiving group by at least one of the plurality of communication nodes with network control capability.

48. The method as in claim 45, further including assigning said node ID of each of said nodes of the transmission-receiving group by each of said nodes of the transmission-receiving group themselves.

49. The method as in claim 3, further comprising:
identifying by at least one of the plurality of communication nodes, the maximum number of child nodes; and
broadcasting or forwarding by at least one of the plurality of communication nodes, the identified maximum number to the logical tree topology.

50. The method as in claim 49, further including assigning the node ID of each of said child nodes by at least one of the plurality of communication nodes.

51. The method as in claim 49, further including assigning the node ID of each of said child nodes by each of said parent nodes.

52. The method as in claim 49, further including assigning the node ID of each of said child nodes by each of said child nodes.

53. The method as in claim 49, further including assigning the node ID of each of said child nodes by the root node.

54. The method as in claim 5, further including at least one of the plurality of communication nodes recording the determined number N and a set of identifications of child nodes along a transmission-receiving path of each of said child nodes.

55. The method as in claim 5, further including each of said child nodes recording the determined number N and a set of identifications of child nodes along its own transmission-receiving path.

56. The method as in claim 3, further including at least one of the plurality of communication nodes recording said maximum number of child nodes.

57. The method as in claim 3, further including each of said child nodes recording said maximum number of child nodes.

58. The method as in claim 9, further including at least one of the plurality of communication nodes recording the number i and a maximum number of child levels.

59. The method as in claim 9, further including each of said child nodes recording the number i and a number of its own child level.

60. The method as in claim 59, further including each of said child nodes recording a maximum number of child levels.

61. The method as in claim 17, wherein the N-carry operation of child nodes of $k^{th}$ child level is performed by adding $a_k \cdot N^{k-1}$ to its parent node ID, and assigning to the identification $a_k$ of each of nodes of $1^{st}$ child level an integer selects within 1 to N.

62. The method as in claim 2, wherein one or more logical trees are formed and the data transmitted including a destination address comprises a logical tree prefix field and a destination node ID of the logical tree field.

63. The method as in claim 62, wherein two or more logical trees are formed and the transmitting further includes:

assigning a different logical tree prefix value to the destination address; and transforming the destination node ID of an original logical tree to a node ID of the assigned logical tree to the destination address, to transmit data utilizing said two or more logical trees.

64. A communication system, comprising:
a plurality of communication nodes, functioning as transmission nodes and receiving nodes, interconnected to form a network,
wherein:
a node ID is assigned for a receiving node in a transmission-receiving group, among the plurality of communication nodes, by an N-carry operation of a determined number N;
at least one transmission node in the transmission-receiving group transmits data to at least one receiving node in the transmission-receiving group by utilizing the node ID; and
the N-carry operation is based on a polynomial that includes a multiplication of an exponential value based on the determined number N and each one of a set of identifications of receiving nodes along a transmission-receiving path, the set of identifications each being one of an intra-level sequential identifier and a parent node intra-level sequential identifier, the transmission-receiving path being from a first receiving level of a first level transmission node to the receiving node for which the node ID is assigned.

65. The system as in claim 64, further comprising a logical tree topology formed by designating communication nodes of the transmission-receiving group as a root node and one or more child nodes, wherein each of the child nodes is a parent node of 0, or of one or more other child nodes.

66. The system as in claim 65, wherein the determined number N is a maximum number of child nodes connected to each of the nodes of the logical tree topology.

67. The system as in claim 64, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $a_k$ is an identification for each of receiving nodes in a $k^{th}$ receiving level relative to the first level transmission node to identify each of said receiving nodes, and $\{a_1, a_2, \ldots, a_{k-1}, a_k\}$ is the set of identifications of receiving nodes along the transmission-receiving path from the first receiving level of the first level transmission node to said receiving node for which the node ID is assigned.

68. The system as in claim 65, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $a_k$ is an identification for each of child nodes in a $k^{th}$ child level relative to the root node to identify each of said child nodes, and $\{a_1, a_2, \ldots, a_{k-1}, a_k\}$ is a set of identifications of child nodes along the transmission-receiving path from a first child level of the root node to a child node for which the node ID is assigned.

69. The system as in claim 64, wherein the determined number N is equal to $2^i$, i being an integer equal to or greater than zero.

70. The system as in claim 65, wherein the determined number N is equal to $2^i$, i being an integer equal to or greater than zero.

71. The system as in claim 70, wherein the N-carry operation of child nodes in each child level other than the first child level is performed by left shifting i bits of a parent node ID and setting different values of lowest i bits of the shifted node ID for the respective child nodes of the child level, and assigning the node ID of each of nodes of the first child level nodes by setting different values of lowest i bits of the node ID of the respective first child level nodes.

72. The system as in claim 70, wherein the N-carry operation of child nodes in each child level other than the first child level is performed by left shifting i bits of its parent node ID and setting the lowest i bits to an integer selected within 0 to $2^i-1$, and assigning the node ID of each of nodes of the first child level nodes an integer selected within 1 to $2^i-1$.

73. The system as in claim 70, wherein the N-carry operation of child nodes in each child level other than the first child level is performed by right shifting i bits of a parent node ID and setting different values of highest i bits of the shifted node ID for the respective child nodes of the child level, and assigning a node ID to each of nodes of the first child level nodes by setting different values of the highest i bits of the node ID of the respective first child level nodes.

74. The system as in claim 70, wherein the N-carry operation of child nodes in each child level other than the first child level is performed by right shifting i bits of its parent node ID and setting the highest i bits to an integer selected within 0 to $2^i-1$, and the node ID of each of nodes of the $1^{st}$ child level nodes is assigned by setting highest i bits an integer selected within 1 to $2^i-1$.

75. The system as in claim 68, wherein the determined number N is equal to $2^i$, i being an integer equal to or greater than zero.

76. The system as in claim 75, wherein the identification $a_k$ of each of nodes of a first child level is assigned an integer selected within 1 to N−1, and the identification $a_k$ of each of nodes of other child levels is assigned an integer selected within 0 to N−1.

77. The system as in claim 76, wherein said identification $a_k$ of each of said child nodes is assigned according to a sequence in which the child node is associated with its parent node.

78. The system as in claim 76, wherein the N-carry operation of child nodes in each child level other than the first child level is performed by left shifting i bits of the parent node ID of each of said child nodes and setting the lowest i bits to the identification $a_k$ of each of said child nodes, and assigning the node ID of each of nodes of first child level its own identification $a_1$.

79. The system as in claim 76, wherein the N-carry operation of child nodes in each child level other than the first child level is performed by right shifting i bits of the parent node ID of each of said child nodes and setting highest i bits of the shifted node ID to the identification $a_k$ of each of said child nodes, and assigning the node ID of each of the nodes of the first child level by setting highest i bits of the node ID of the respective first child level nodes its own identification $a_1$.

80. The system as in claim 64, wherein the node ID of each said receiving node is assigned according to a sequence in which the receiving node is associated with its transmission node.

81. The system as in claim 66, wherein at least one of the plurality of communication nodes identifies the maximum number of child nodes.

82. The system as in claim 81, wherein at least one of the plurality of communication nodes broadcasts or forwards the identified maximum number to the tree topology.

83. The system as in claim 64, wherein at least one of the plurality of communication nodes assigns a node ID for each of said receiving nodes.

84. The system as in claim 65, wherein at least one of the plurality of communication nodes assigns a node ID for each of said receiving nodes.

85. The system as in claim 84, wherein the root node assigns a node ID for each of said child nodes.

86. The system as in claim 84, wherein each of said child nodes assigns its own node ID.

87. The system as in claim 64, wherein at least one of the plurality of communication nodes assigns the node ID for a handover node, when the system processes a handover operation.

88. The system as in claim 65, wherein at least one of the plurality of communication nodes assigns the node ID for a handover node, when the system processes a handover operation.

89. The system as in claim 88, wherein the node ID of the handover node is assigned by the root node.

90. The system as in claim 64, wherein a handover node assigns its own node ID, when the system processes a handover operation.

91. The system as in claim 65, wherein the system forms one or more logical trees and the data transmitted includes a destination address including a logical tree prefix field and a destination node ID of the logical tree field.

92. The system as in claim 91, wherein two or more logical trees are formed and the system assigns a different logical tree prefix value to the destination address and transforms the destination node ID of an original logical tree to a node ID of the assigned logical tree to the destination address, to transmit data utilizing said two or more logical trees.

93. A communication node in a transmission-receiving group of a network, the network including a plurality of communication nodes functioning as transmission nodes and receiving nodes, and the transmission-receiving group including at least one transmission node and at least one receiving node, the communication node comprising:
at least one memory to store data and instructions; and
at least one processor configured to access the memory, and when executing the instructions, configured to transmit communication data by utilizing a node ID,
wherein the node ID is assigned for a receiving node in the transmission-receiving group by an N-carry operation of a determined number N, and
the N-carry operation is based on a polynomial that includes a multiplication of an exponential value based on the determined number N and each one of a set of identifications of receiving nodes along a transmission-receiving path, the set of identifications each being one of an intra-level sequential identifier and a parent node intra-level sequential identifier, the transmission-receiving path being from a first receiving level of a first level transmission node to the receiving node for which the node ID is assigned.

94. The communication node as in claim 93, wherein the network further comprises a logical tree topology formed by designating communication nodes of the transmission-receiving group as a root node and one or more child nodes, wherein each of the child nodes is a parent node of 0, or of one or more other child nodes.

95. The communication node as in claim 94, wherein the determined number N is a maximum number of child nodes connected to each of the nodes of the logical tree topology.

96. The communication node as in claim 93, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $a_k$ is an identification for each of receiving nodes in a $k^{th}$ receiving level relative to the first level transmission node to identify each of said receiving nodes, and $\{a_1, a_2, \ldots a_{k-1}, a_k\}$ is the set of identifications of receiving nodes along the transmission-receiving path from the first receiving level of the first level transmission node to said receiving node for which the node ID is assigned.

97. The communication node as in claim 94, wherein the N-carry operation is performed by a polynomial $a_k \cdot N^{k-1} + a_{k-1} \cdot N^{k-2} + \ldots + a_2 \cdot N^1 + a_1 \cdot N^0$, wherein $a_k$ is an identification for each of child nodes in a $k^{th}$ child level relative to the root node to identify each of said child nodes, and $\{a_1, a_2, \ldots, a_{k-1}, a_k\}$ is a set of identifications of child nodes along the transmission-receiving path from a first child level of the root node to a child node for which the node ID is assigned.

98. The communication node as in claim 93, wherein the determined number N is equal to $2^i$, i being an integer equal to or greater than zero.

99. The communication node as in claim 94, wherein the determined number N is equal to $2^i$, i being an integer equal to or greater than zero.

100. The communication node as in claim 99, wherein the N-carry operation of child nodes in each child level other than the first child level is performed by left shifting i bits of a parent node ID and setting different values of lowest i bits of the shifted node ID for the respective child nodes of the child level, and assigning the node ID of each of nodes of the first child level nodes by setting different values of lowest i bits of the node ID of the respective first child level nodes.

101. The communication node as in claim 99, wherein the N-carry operation of child nodes in each child level other than the first child level is performed by left shifting i bits of its parent node ID and setting the lowest i bits to an integer selected within 0 to $2^i-1$, and assigning the node ID of each of nodes of the first child level nodes an integer selected within 1 to $2^i-1$.

102. The communication node as in claim 99, wherein the N-carry operation of child nodes in each child level other than the first child level is performed by right shifting i bits of a parent node ID and setting different values of highest i bits of the shifted node ID for the respective child nodes of the child level, and assigning a node ID to each of nodes of the first child level nodes by setting different values of the highest i bits of the node ID of the respective first child level nodes.

103. The communication node as in claim 99, wherein the N-carry operation of child nodes in each child level other than the first child level is performed by right shifting i bits of its parent node ID and setting the highest i bits to an integer selected within 0 to $2^i-1$, and the node ID of each of nodes of the $1^{st}$ child level nodes is assigned by setting highest i bits to an integer selected within 1 to $2^i-1$.

104. The communication node as in claim 97, wherein the determined number N is equal to $2^i$, i being an integer equal to or greater than zero.

105. The communication node as in claim 104, wherein the identification $a_k$ of each of nodes of the first child level is assigned an integer selected within 1 to N−1, and the identification $a_k$ of each of nodes of other child levels is assigned an integer selected within 0 to N−1.

106. The communication node as in claim 105, wherein said identification $a_k$ of each of said child nodes is assigned according to a sequence in which the child node is associated with its parent node.

107. The communication node as in claim 105, wherein the N-carry operation of child nodes in each child level other than the first child level is performed by left shifting i bits of the parent node ID of each of said child nodes and setting the lowest i bits to the identification $a_k$ of each of said child nodes, and assigning the node ID of each of nodes of first child level its own identification $a_1$.

108. The communication node as in claim 105, wherein the N-carry operation of child nodes in each child level other than the first child level is performed by right shifting i bits of the parent node ID of each of said child nodes and setting highest i bits of the shifted node ID to the identification $a_k$ of each of said child nodes, and assigning the node ID of each of the nodes of the first child level by setting highest i bits of the node ID of the respective first child level nodes to its own identification $a_1$.

109. The communication node as in claim 93, wherein the node ID of each said receiving node is assigned according to a sequence in which the receiving node is associated with its transmission node.

110. The communication node as in claim 95, wherein at least one of the plurality of communication nodes identifies the maximum number of child nodes.

111. The communication node as in claim 110, wherein at least one of the plurality of communication nodes broadcasts or forwards the identified maximum number to the logical tree topology.

112. The communication node as in claim 93, wherein at least one of the plurality of communication nodes assigns a node ID for each of said receiving nodes.

113. The communication node as in claim 94, wherein at least one of the plurality of communication nodes assigns a node ID for each of said receiving nodes.

114. The communication node as in claim 94, wherein the communication node assigns its own node ID.

* * * * *

UNITED STATES PATENT AND TRADEMARK OFFICE
CERTIFICATE OF CORRECTION

Page 1 of 1

PATENT NO.         : 8,040,823 B2
APPLICATION NO.    : 11/955582
DATED              : October 18, 2011
INVENTOR(S)        : Lin et al.

It is certified that error appears in the above-identified patent and that said Letters Patent is hereby corrected as shown below:

In the Claims

In Column 8, Line 65, in Claim 5, delete "is being" and insert -- is --, therefor.

In Column 15, Line 66, in Claim 96, delete "$\{a_1, a_2, \ldots a_{k-1}, a_k\}$" and insert -- $\{a_1, a_2, \ldots, a_{k-1}, a_k\}$ --, therefor.

Signed and Sealed this
Twenty-eighth Day of October, 2014

Michelle K. Lee
*Deputy Director of the United States Patent and Trademark Office*